Patented Nov. 20, 1928.

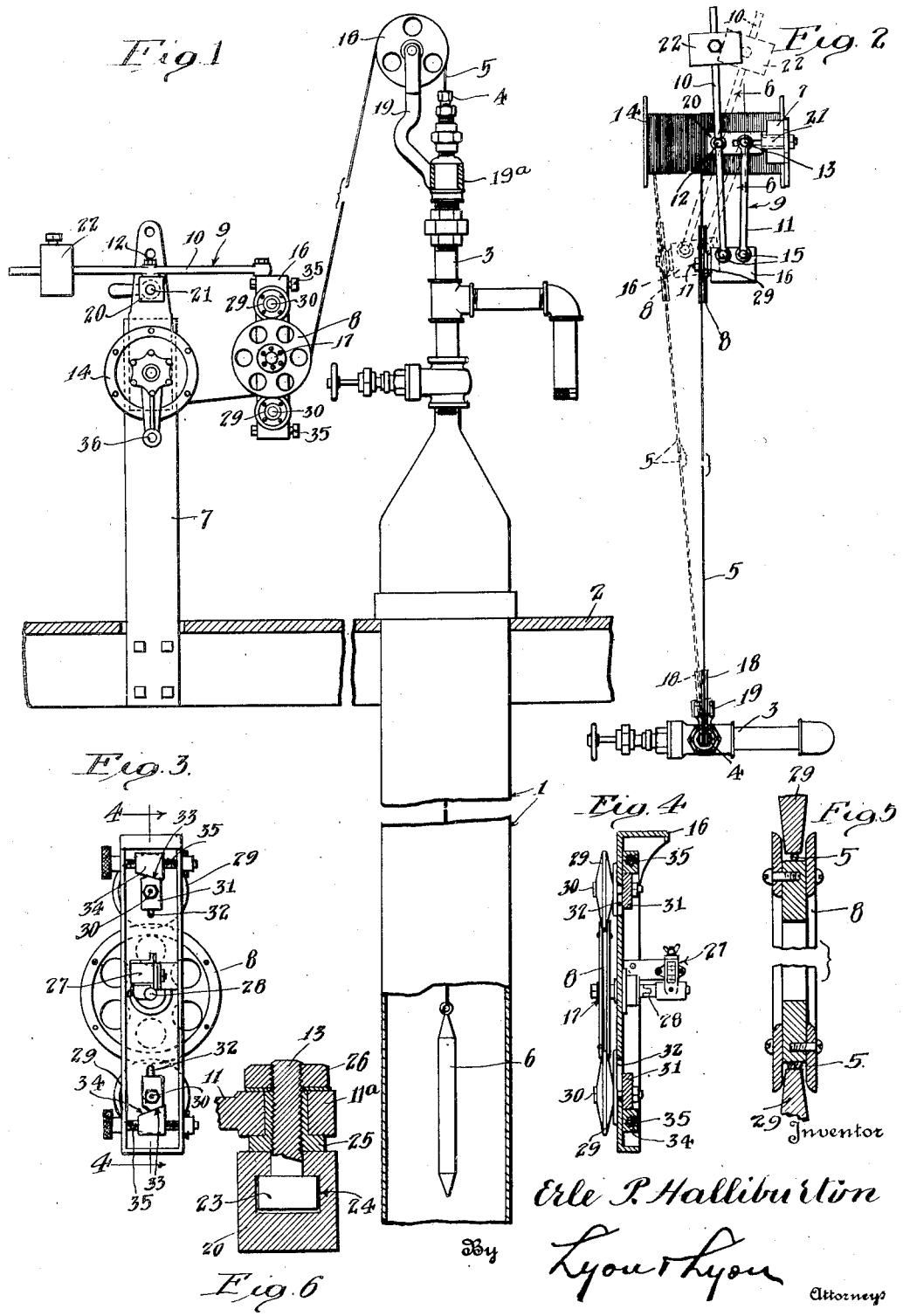

1,692,037

UNITED STATES PATENT OFFICE.

ERLE PALMER HALLIBURTON, OF LOS ANGELES, CALIFORNIA.

WELL-SOUNDING DEVICE.

Application filed June 15, 1926. Serial No. 116,156.

This invention relates to a device for sounding deep wells, that is to say, for measuring their depth. The general object of this invention is to provide a simple device for this purpose which will operate to guide the sounding wire from the reel to the point where it passes down into the well; also to provide a device of this kind in which the measuring wheel will accurately indicate the amount of wire which has passed into the well; also to provide means for supporting the measuring wheel in such a way that it can oscillate to and fro before the reel, and so that the plane of the measuring wheel is maintained substantially in the line of pull of the wire passing from the reel to the well.

A further object of the invention is to provide a construction for guiding the sounding wire into the well which, in operation, will indicate when the sounding weight has reached the bottom of the well.

Further objects of the invention will appear hereinafter.

The invention consists in the novel parts and combination of parts to be described hereinafter, all of which contribute to produce an efficient well-sounding device.

A preferred embodiment of the invention is described in the following specification, while the broad scope of the invention is pointed out in the appended claims.

In the drawing:

Figure 1 is a side elevation in partial section, with certain parts broken away, indicating the apparatus as applied to a well. In this view, however, the measuring apparatus is indicated as much nearer to the well than it actually is in practice; this is done in order to economize space in the drawing.

Figure 2 is a plan of the apparatus showing more nearly its relation to the well, that is to say, this view indicates more nearly the relative distance of the measuring apparatus from the well.

Figure 3 is a rear elevation of the bracket which carries the measuring roller.

Figure 4 is a vertical section taken about on the line 4—4 of Fig. 3.

Figure 5 is a vertical section through the measuring roller with the middle portion broken away; this view is upon an enlarged scale and also indicates the rims of the presser rollers which hold the coil of measuring wire tightly pressed against the measuring roller.

Figure 6 is a vertical section taken about on the line 6—6 of Fig. 2, and particularly illustrating details of adjusting means which is useful in regulating the operation of the support for the measuring wheel.

In the drawing, 1 represents the casing of a deep well, which casing extends up through the floor 2 of a derrick and carries a flow pipe 3 provided with a cap 4 through which the sounding wire 5 passes downwardly into the well. The lower end of the sounding wire is provided with a weight 6. In applying my invention, I provide a reel on which piano wire is coiled, and at the well I provide guiding means for guiding the weighted sounding wire down into the well. The measuring wheel may be located at any point between the reel and the well, but it is preferably located at some point between the guiding means at the well and the reel. I provide means for supporting the measuring wheel so that it will oscillate to and fro before the reel as the wire is drawn from the reel. The construction is such that the measuring wheel not only oscillates or swings in a horizontal direction before the reel, so as to accommodate itself to the point at which the wire is being drawn from the reel, but the plane of the measuring roller swings so that it is maintained in the plane or line of pull of the wire in passing from the reel to the well. In other words, the construction is such that the measuring wheel maintains itself in proper alignment with the wire in any position or direction it may take as the unwinding of the wire from the reel occurs.

In order to accomplish this, I provide a relatively fixed support such as a post 7, which extends up from the floor of the derrick. This post is usually about twelve feet from the flow pipe 3. On this relatively fixed support, I mount means for supporting a measuring wheel 8 and capable of enabling the wheel to oscillate as described above. This oscillating means is preferably in the form of a frame 9, said frame consisting of two bars or arms 10 and 11 which are supported on pivot pins or bolts 12 and 13, respectively, near the reel 14 which is rotatably supported on the stanchion or post 7. These arms 10 and 11 extend toward the well and their outer ends are pivotally connected by pivot pins or bolts to a bracket or oscillating head 16. On this head 16 the measuring wheel 8 is mounted to rotate on a fixed arbor 17.

The sounding wire 5 has a run passing from the reel in a vertical radial plane with respect to the axis of the well; that is to say, it passes in a coil extending completely around the circumference of measuring wheel 8, from which it passes upwardly and over guiding means, such as a guide pulley 18, which may be supported on a bracket 19 on the upper end of the flow pipe. The pivot bolts 12 and 13 which support the arms 10 and 11 are attached to the upper side of a rock bar 20, which is supported to rock on a horizontal stub shaft 21 (see Fig. 2). The arm 10 extends from the pivot 12 away from the well and carries a counter weight 22 for counter-balancing the weight of the bracket 16 and the measuring wheel and its contiguous parts.

As indicated in Fig. 2, the pivot 12 is located substantially over the central axis and middle plane of the reel 14. By reason of the pivot connections 12, 13 and 15, it will be evident that as the wire is drawn from the reel, the frame 9 can oscillate to maintain the measuring wheel 8 in line with the position and direction of pull of the wire. In order to enable the measuring wheel to maintain its plane substantially coinciding with the line of pull of this wire, that is, so that it oscillates about an axis substantially coinciding with the axis of the well, I construct the device so that the axes of the pivots 12 and 13 are slightly further apart than the axes of the pivots or bolts 15.

It may be desired to adjust this distance, and for this purpose the bolt 13 is preferably mounted as illustrated in Fig. 6, that is to say, its head 23 is mounted in a T-slot 24 and the head or end 11ª of the arm 11 is received on a bushing 25. The threaded end of the pivot bolt 13 receives a clamping nut 26 which screws down onto the end of this bushing and retains the rod or bar 11. By loosening up the nut 26, it will be evident that the pin or bolt 13 can be adjusted into any desired position in the slot. In order to insure accuracy of measurement, the measuring wheel 8 is coated on its outer face with a hard metal known as "Stoodite", which reduces the wear on the measuring wheel to a minimum. In practice, this measuring wheel is preferably two feet in circumference, and I provide a registering device or indicator 27 which indicates every half revolution of the measuring wheel. This indicator is driven by the shaft 28 of the measuring wheel (see Fig. 3).

In order to insure that the coil or coils of the wire will be wrapped closely around the measuring wheel, and also to insure that there will be a sufficient amount of tension in the line or wire, I provide tension means to cooperate with the measuring wheel. For this purpose, I provide two presser rollers 29, the edges of which press against the wire lying on the face of the measuring wheel (see Figs. 4 and 5).

In order to regulate the amount of pressure of these pressure wheels or rollers on the wire, their shafts 30 are carried respectively in blocks 31 which are guided is slots 32, so as to move toward or from the measuring wheel (see Fig. 3). The outer side of each block 31 is provided with an inclined face 33 which is engaged by the inclined face of a wedge block 34. These wedge blocks are mounted on adjusting screws 35 which may be turned as desired to force the blocks 31 inwardly toward the wheel. In this way, the pressure of the edges of the pressure rollers 29 can be nicely regulated.

In operating the device, a crank 36 on the reel is rotated slowly so as to permit the wire to pass from it around the measuring roller and thence over the guide pulley 18 down into the well. The counter weight 22 is adjusted so as to hold the oscillating frame 9 in a substantially horizontal position, as indicated in Fig. 1.

As the weight 6 descends into the well, the wire drawn from the drum or reel 14 rotates the measuring wheel, which accurately indicates the amount of line which is passed into the well by means of the indicator 27. As the unwinding point of the wire at the reel moves to and fro on the reel, the wire passing around the measuring roller keeps the measuring roller in line with the direction of pull of the wire, that is to say, it causes the oscillating frame 9 to oscillate to and fro in a horizontal direction, as indicated by the dotted lines in Fig. 2. When this oscillation occurs, the plane of the measuring wheel is maintained substantially in the line of pull of the wire, so that the wheel does not merely travel back and forth as the unwinding point travels to and fro, but it maintains itself in a proper plane of rotation.

The man operating the device keeps his hand on the taut wire between the measuring wheel 8 and the pulley 18, and when the weight 6 strikes the bottom of the well, its arrival will be indicated by vibration in the wire, and by change of position of the oscillating frame 9, that is to say, change in tension in the wire, will tend to cause a rotation of the oscillating frame 9 on the horizontal axis of the shaft of the rocking bar 20.

The arm 19 is mounted with a swivel collar 19ª on the cap of the flow pipe.

It is understood that the embodiment of the invention described herein is only one of the many embodiments this invention may take, and I do not wish to be limited in the practice of the invention, nor in the claims, to the particular embodiment set forth.

What I claim is:—

1. In a device for sounding a deep well, the combination of a reel, guiding means at the well, a measuring wheel located in a general horizontal direction between the reel and the guiding means, a weighted sounding wire coiled on the reel, passing around the measuring wheel, over the said guiding means and into the well, and means for supporting the measuring wheel to oscillate to and fro before the reel about an axis substantially coinciding with the axis of the well, as the wire is drawn off from the same.

2. In a sounding device for a deep well, the combination of a reel, a guide pulley at the well, mounted to oscillate on an axis substantially coinciding with the axis of the well, a measuring wheel between the reel and the guide wheel, a sounding wire leading from the reel coiled around the said measuring wheel, means for yieldingly supporting the measuring wheel, said means being constructed to permit shifting of the measuring wheel bodily to and fro as the wire is drawn off from the reel, and having means for maintaining the measuring wheel substantially in the plane in which the wire is pulled from the reel to the guiding means.

3. In a sounding device for a deep well, the combination of a reel, a guide pulley at the well, mounted to oscillate on an axis substantially coinciding with the axis of the well, a measuring wheel between the reel and the guide wheel, a sounding wire leading from the reel, coiled around the said measuring wheel, a floating frame carrying the measuring wheel and movable to and fro before the reel by the wire as it is pulled from the reel, said frame having means for maintaining the plane of the measuring wheel substantially in the line of pull of the wire in passing from the reel to the guide pulley.

4. In a sounding device for a deep well, the combination of a reel, a guide pulley, a fixed supporting member, an oscillating frame mounted on the fixed member and having a pair of arms extending toward the well, a bracket carried by the arms, a measuring wheel carried by the bracket, a sounding wire coiled about the measuring wheel and passing from the reel to the guide pulley, tension-means cooperating with the measuring wheel for resisting the rotation of the measuring wheel by the wire, said arms constructed and operating to permit the oscillating frame to swing the measuring wheel to and fro before the reel as the wire is pulled from the reel.

5. In a sounding device for a deep well, the combination of a reel, a guide pulley at the well, a relatively fixed support, an oscillating frame comprising a pair of arms pivotally mounted on the fixed support, extending toward the well, and a bracket pivotally attached to the said arms, a measuring-wheel carried by the bracket, a sounding wire coiled around the measuring-wheel and passing from the reel to the guide pulley, tension-means cooperating with the measuring wheel for resisting the rotation of the measuring wheel by the wire as it is drawn off from the reel, the axes of the pivots of said arms on the fixed support being disposed further apart than the axes of the pivots connecting the ends of the arms to the said bracket, whereby the bracket and pulley oscillate to and fro before the reel as the wire is drawn from the same, said arms cooperating to maintain the plane of the measuring wheel substantially in the line of pull of the wire as the measuring wheel oscillates to and fro before the reel.

6. In a sounding device for a deep well, the combination of a flow pipe, a guide pulley supported on the flow pipe, a rock-bar located between the reel and the guide pulley and mounted to rock on a substantially horizontal axis, a measuring wheel, an oscillating frame supported on the rock-bar and carrying the measuring wheel for supporting the measuring wheel so as to oscillate to and fro before the reel, and a sounding wire passing from the reel around the measuring wheel over the guide pulley and into the flow pipe.

7. In a device for sounding a deep well, the combination of a guide pulley at the well, a reel, a measuring wheel between the reel and the guide pulley, an oscillating frame mounted to oscillate to and fro in a substantially horizontal plane on an axis substantially coinciding with the axis of the well, a measuring wheel carried by the oscillating frame, and a sounding wire passing from the reel around the measuring wheel and over the guide pulley.

8. In a device for sounding a deep well, the combination of a reel located a short distance to one side of the axis of the well, guiding means located adjacent to the axis of the well, a weighted sounding wire coiled on the reel and having a run passing in a substantially vertical radial plane with respect to the axis of the well toward the well and past said guiding means, a measuring wheel located on the said run between the reel and the guiding means, and means for supporting the measuring wheel to oscillate to and fro along the length of the reel as the wire is drawn off from the same.

9. In a device for sounding a deep well, the combination of a reel located a short distance to one side of the axis of the well, guiding means located adjacent to the axis of the well, a weighted sounding wire coiled on the reel and having a run passing in a substantially vertical radial plane with respect to the axis of the well toward the well and past said guiding means, a measuring wheel located on the said run between the reel and the guiding means, and means for supporting the measuring wheel to oscillate to and fro along the length of the reel as the wire is drawn off from the same, said wire having a coil passing completely around the measuring wheel.

10. In a device for sounding a deep well, the combination of a reel located a short distance to one side of the axis of the well, guiding means located adjacent to the axis of the well, a weighted sounding wire coiled on the reel and having a run passing in a substantially vertical radial plane with respect to the axis of the well, toward the well, and past said guiding means, an oscillating head with means for supporting the same to oscillate to and fro along the length of the reel as the wire is drawn off from the same, and a measuring wheel carried by the oscillating head and maintained by the oscillating head substantially in the said vertical radial plane, said wire engaging the measuring wheel to operate the same.

11. In a device for sounding a deep well, the combination of a reel located a short distance to one side of the axis of the well, guiding means located adjacent to the axis of the well, a weighted sounding wire coiled on the reel and having a run passing in a substantially vertical radial plane with respect to the axis of the well toward the well and past said guiding means, an oscillating head with arms for supporting the same to oscillate to and fro along the length of the reel as the wire is drawn off from the same, a measuring wheel carried on the said oscillating head and maintained substantially in said vertical radial plane, said wire having a coil passing completely around the measuring wheel.

12. In a device for sounding a deep well, the combination of a pipe extending upwardly on the axis of the well, a reel located a short distance to one side of the pipe, a frame supporting the reel, a guide wheel supported on the said pipe and located in a vertical plane extending radially from the axis of the well to the said reel, a weighted sounding wire coiled on the reel and having a run in the said vertical plane passing from the reel toward the well and over the said guide wheel, an oscillating head with means for supporting the same from the reel frame, enabling the same to oscillate to and fro along the length of the reel as the wire is drawn off from the same, said wire having a coil passing completely around the measuring wheel.

Signed at Los Angeles, California, this 25 day of May 1926.

ERLE PALMER HALLIBURTON.